Figure 1:
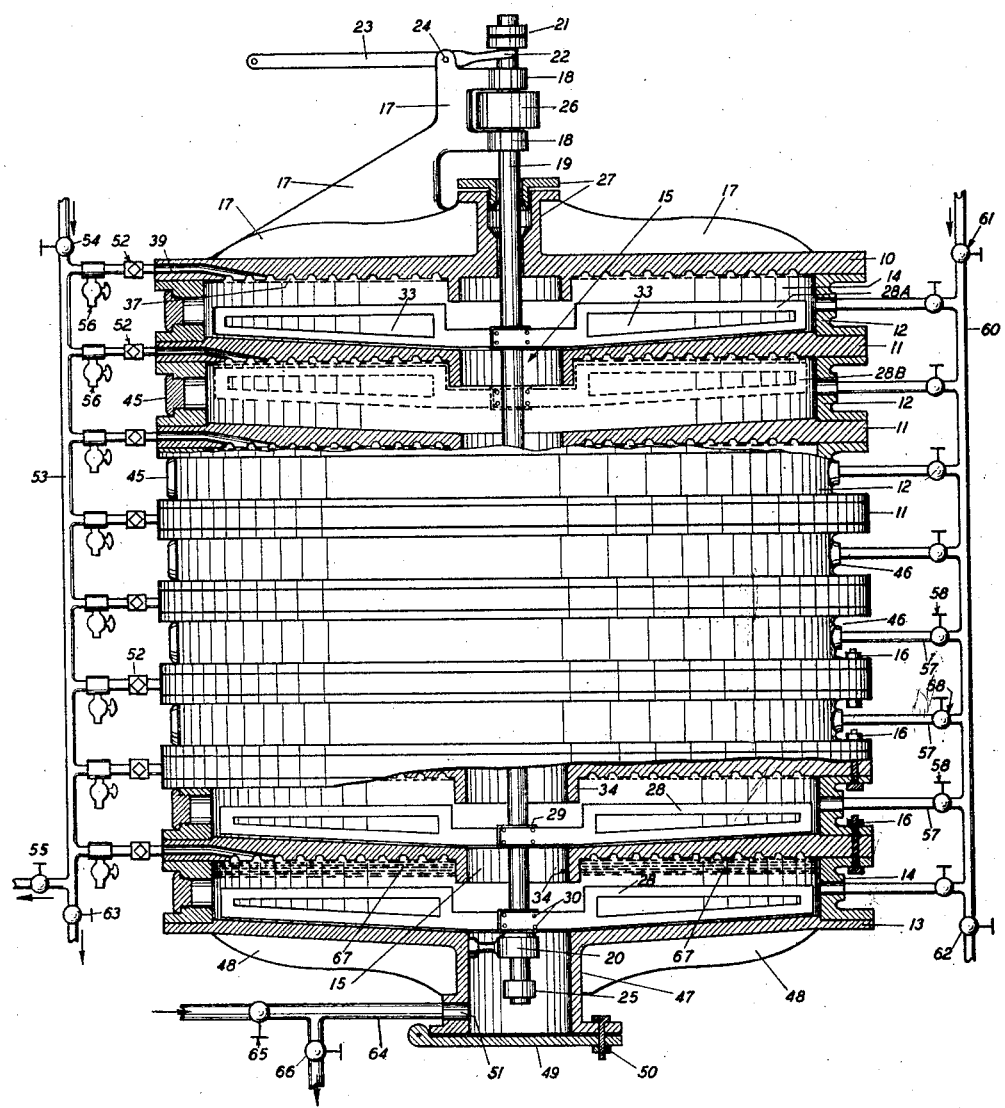

Dec. 20, 1932.  P. W. PRUTZMAN  1,891,396
FILTER PRESS
Filed March 3, 1930   3 Sheets-Sheet 1

PAUL W. PRUTZMAN
INVENTOR

PAUL W. PRUTZMAN
INVENTOR

Patented Dec. 20, 1932

1,891,396

UNITED STATES PATENT OFFICE

PAUL W. PRUTZMAN, OF LOS ANGELES, CALIFORNIA

FILTER PRESS

Application filed March 3, 1930. Serial No. 432,769.

My invention relates to a press of the general type known as the plate and frame press, composed of metal plates with corrugated surfaces on which the filtering medium rests and with channels within the plates for the escape of liquids which pass through the filtering medium, these plates being separated by metallic circumferential rings which act to form chambers between the plates, for the reception of unfiltered mixture and for the accumulation of cakes of the solid matter extracted from the mixture. My invention, however, departs from the ordinary construction of plate and frame presses in several important particulars, specifically in placing the filtering surfaces in a horizontal instead of the customary vertical position and in forming the cake only on the lower side of the plate, the object being to produce a press adapted to meet certain specific and unusual requirements rather than to produce an improved press for general service.

In certain chemical operations, as for instance in the treatment of petroleum oils with decolorizing clays at elevated temperatures, it is essential or highly desirable to filter without any material drop in temperature, to completely and positively exclude atmospheric oxygen from the press and the effluent therefrom, to maintain the solids in suspension in the liquid so as to obtain uniform distribution of the solids over the filtering surface, to reduce to a minimum the cooling of the press during the cleaning stage in the cycle, and to discharge the cakes of solids without undue exposure to the air and under conditions which will avoid the formation of noxious or inflammable vapors. To promote the second and the last of these objects it is desirable to pass through the press, while filtering, and while cleaning, a controlled quantity of steam or of an oxygen free gas or vapor. All of these requirements are present in the particular operation referred to, and some or all of them in many other filtrations at high temperatures, filtrations of volatile, inflammable or noxious liquids, and filtrations producing a cake which cannot safely be exposed to the air until after cooling or other treatment. These requirements are not met by any of the various types of filter press heretofore known or proposed and it is to meet these requirements that my invention is directed.

A specific embodiment of my invention is illustrated in the attached drawings and the following description thereof, the modification shown being particularly adapted to the filtration of lubricating or other oils at temperatures close to those at which vapors are freely evolved, and the description given is in connection with that specific operation. It will be understood that I do not limit the use of my invention to such operation, as it has numerous other uses, nor to the exact structure shown, as it may be materially modified without at all departing from the spirit of my invention, which I would limit solely by the scope of the attached claims.

Figure 2:
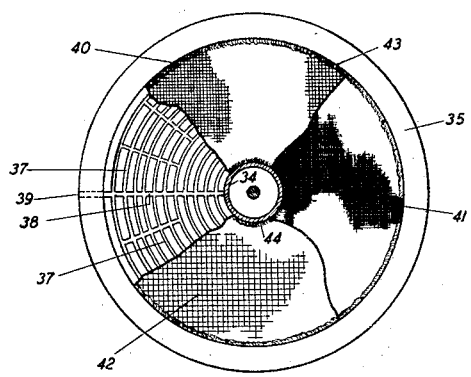
Figure 3:
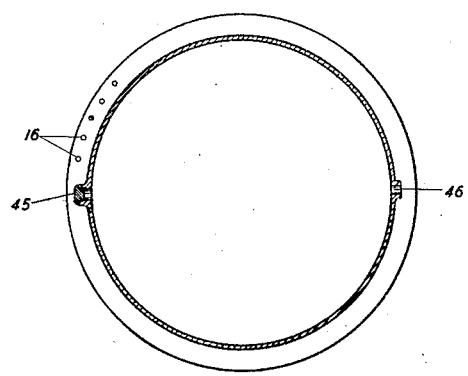
Figure 4:
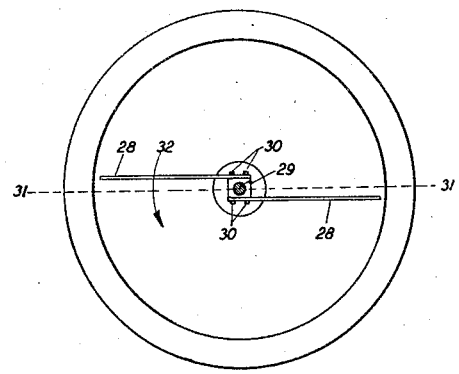
Figure 5:
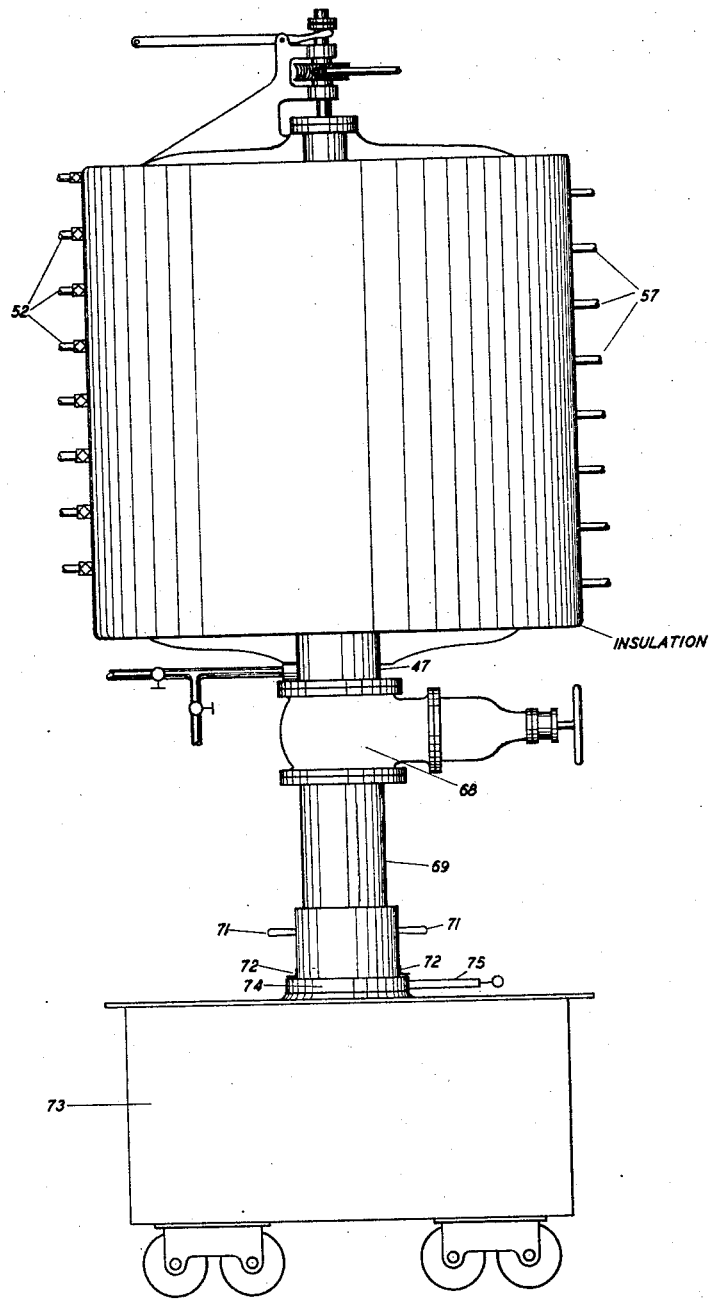

In the attached drawings Fig. 1 illustrates, partly in vertical elevation and partly in cross section, a complete embodiment of my invention, Fig. 2 represents the lower or filtering side of any one of the plates, Fig. 3 is a plan section of any one of the frames, Fig. 4 shows in plan a preferred arrangement for the scrapers, Figs. 2 to 4 inclusive being on a reduced scale, and Fig. 5 shows in elevation an arrangement of filter and closed car by which filter cake may be withdrawn and removed without exposure to the air.

Referring to Fig. 1, 10 is a top plate, 11—11 are intermediate filtering plates, 12—12 are frames or spacing rings and 13 is a bottom plate, the whole forming a hollow body having a vertical axis and being divided into chambers 14—14 by the plates, these chambers communicating through the central openings 15—15. Any preferred number of plates and a corresponding number of frames may be used. The stack may be made up by bolting through the frame flanges and the abutting edges of the plates as indicated at 16. As these bolts are withdrawn only when the metallic filter cloth fails, the joint between frames and plates should be semi-permanent, a paper gasket made up with red lead and linseed oil being suggested.

The top and bottom plates 10 and 13 are provided with stiffening ribs 17 and 48 respectively, these plates being subjected to the bursting stress of the maximum pressure to be carried by the filter. The frames and their flanges also have to withstand this pressure and should be proportioned accordingly.

The top plate is provided with a rigid arm, an extension of one of the ribs 17 carrying the two bearing boxes 18—18 in which runs a vertical shaft 19 centrally aligned within the shell and stayed at its lower end by a bearing 20 supported from the bottom plate. At the upper end of this shaft is a thrust bearing 21, the upper half of which is made fast to the shaft while the lower half runs free and engages an end 22 of a lever 23 which is pivotally supported on the arm 17 as by the pin 24. When the outer end of this lever is depressed the shaft is vertically raised and on releasing the lever it is returned by its own weight and by that of the scrapers which it carries. The throw of the shaft should be such that when a collar 25 on the lower end of the shaft contacts with the bearing 20 the scrapers will just clear the filtering medium and when the lever 23 is raised to its maximum height the lower edges of the scrapers will barely clear the plates beneath. A pulley, spur gear or worm gear 26 is fastened on the shaft 19 and restrained against end movement by the boxes 18—18, the shaft being driven by the pulley but free to move endwise therethrough. The pulley is drawn by a suitable belt, gear or worm not shown. The upper plate 10 carries a stuffing box 27 through which the shaft passes, leakage being restrained by suitable soft packing around the shaft.

The entire arrangement shown for raising and lowering the shaft is suggestive only, as there are other well known mechanical means for accomplishing the same end.

Within each chamber is placed one or more scrapers 28, which are rigidly attached to and revolved by the shaft. A preferred method for attaching these scrapers is illustrated in Fig. 4, in which 29 is a block keyed to the shaft, 28 are the scrapers and 30 are bolts by which the scrapers are attached to the block. It will be noted that the scrapers in Fig. 4 are located back of the diametric line 31—31, the direction of rotation being as indicated by the arrow 32. This location is preferable as it assists the scrapers both in removing filter cake and in discharging it into the central opening as will later be described.

The scrapers 28 may be made of steel plate or other suitable material and should be cut away in part, as at 33, to assist the mixing effect which will be described. The scrapers are of such width and are so located that when the shaft is depressed they are in the position indicated at 28A and when the shaft is fully raised are in the position indicated by the dotted lines at 28B.

The lower surface of each of the plates except the bottom plate is provided with a nozzle or ring flange 34, surrounding the central opening 15 and of a depth slightly greater than the maximum thickness of the cake to be formed, or say 3 inches for ordinary service, (this depth being unrelated to the diameter of the filter plate). This flange is designed to retain the filter cake and has other uses which will appear.

Between this flange and the edge portion 35 of the plate, (see Fig. 2), which is faced smooth for making up the stack, the lower face only of the plate is corrugated in any usual or preferred manner as at 37, to permit liquid passing through the filtering medium to make its way into a groove 38 by which it is conducted into an outlet tube 39, cored in the metal of the plate, this tube preferably being tapped with a pipe thread.

Over the corrugated surface of the plate I preferably place a layer of stiff wire mesh 40, on this mesh a layer of very fine wire mesh 41, such as monel metal filter cloth, and on this a layer of coarse stiff wire mesh 42. These materials are cut into circles of a diameter slightly less than the internal diameter of the frames 12 and are cut away at the center to fit over the nozzle or flange 34. These sheets of mesh are then brazed to the plate at their outer and inner edges as at 43 and 44, the spelter passing through the three layers which, when so attached to the plate, should lie perfectly flat. The object of the mesh 40 is to prevent the fine flexible mesh 41 from being forced into the corrugations by the pressure applied during filtering, and the object of the mesh 42 is to prevent mesh 41 from contacting with and being worn or damaged by the scrapers.

The upper side of the plates should be smooth and is preferably depressed toward the central opening, this slight taper materially aiding the scrapers in moving the cake toward the center.

Referring again to Fig. 1, the frames are each provided with two openings through the ring; an inspection opening 45, closed by a screw plug, through which the interior of the chamber may be viewed, and a pipe-tapped opening 46 for the admission of steam as will later be described.

The bottom plate 13 is equipped with a downward extension or nozzle 47 and with a plurality of reinforcing ribs 48. The nozzle should have the same internal diameter as the central plate openings 15. It is closed at its lower end by any preferred type of closure which will uncover it entirely when opened. The drawing, Fig. 1, shows a simple hinged plate 49 held in place by bolts 50 but the total supply may be increased or diminished by suitable regulation of master steam valve 61 without disturbing the regulation of valves 58. When the press is substantially empty the flow of steam through the cakes may be increased, to remove as much as possible of the entrained oil, and this flow should be continued so long as any material amount of oil is indicated at the test cocks 56, during which time the drain valve 66 should be left very slightly open to care for any further oil which may find its way down from the upper surfaces of the plates and from the sides of the shell. It will be noted that, because of the downward projection of the flanges 34, none of this drip oil can find its way back to the cakes.

The cakes having been finally or sufficiently freed from oil, the flow of steam into the press may be shut off (unless it is necessary to blanket the cake material as hereinafter described) and the bottom plate 49 dropped by removing bolt 50 or an equivalent operation. The scrapers being still in revolution, the lever 23 is gently and slowly depressed, gradually lifting the scrapers to the position shown by the dotted lines 28B, during which operation the cake will be scraped from the filtering medium and dropped onto the sloping upper surface of the plate next below. On then slowly returning the lever 23 to its original position the scrapers are lowered to their original position and the broken cake discharged through the central openings 15 and out of the bottom of the press. The bottom plate is then returned to the closed position, after which the press is ready for a new supply of mixture to be filtered. This cleaning operation is performed in a miminum of time and, as the press is or should be heavily insulated, with practically no drop in temperature.

In case the cake discharged by the press is at a temperature at which it is liable to ignition on contact with the air, or if it gives off noxious fumes, the press may be discharged without any appreciable access of air into a closed vessel. Referring to Fig. 5, 47 is the bottom nozzle of the press, as shown in Fig. 1, but the bottom plate 49 shown in that figure is replaced by an ordinary straightway valve indicated at 68 in Fig. 5. From this valve depends a pipe nipple 69 around which is fitted a slip nipple or sleeve 70 arranged to be raised or lowered as by handles 71 and provided with light lugs 72. A suitable receptacle such as the closed car 73 is provided with a manhole opening 74 closed by a sliding vane 75. The car being run into position beneath the press sleeve 70 is lowered until its lower end enters the manhole 74 and is supported by the lugs 72. The slide 75 is then pulled into open position, valve 68 opened, and the cleaning of the press proceeded with as above described, the cake material dropping into the car. By keeping a slight flow of steam going through the press during this operation the contact of air with the discharged cake material may be entirely avoided, but if this material were noxious rather than inflammable this steam supply would not be used. On completion of the cleaning, slide 75 and valve 68 would be closed, sleeve 70 raised free, and the car with its contents could then be removed to cool or to be discharged in a location suitable to avoid danger or fume nuisance.

I claim as my invention:

1. In a filter press adapted to be supported in a fixed vertical position and having a plurality of horizontally disposed rigid filtering plates, spacing means between each pair of plates, an upper head, a lower head, means for locking said plates and heads into a unitary structure adapted to resist internal pressure, means for introducing a suspension of solid and liquid into said structure under pressure, each said plate having a central opening and being superficially channeled on its lower surface and provided with a passage leading from said channels to the exterior of said structure, a centrally located rotatable shaft having scrapers affixed thereto, a centrally located opening in said lower head and a detachable closure for said opening; the improvement comprising: an impervious upper surface on each said plate; a filtering medium fixed adjacent the lower face of said plate around said opening, and means for imparting a limited vertical movement to said rotatable shaft to cause each said scraper to remove solids from said medium when said shaft and scraper are moved upwardly and to move said solids into said central opening when said shaft and scraper are moved downwardly.

2. In a filter press substantially as defined in claim 1 characterized by having a downward looking annular flange immediately surrounding said central opening in each said plate, said flange and said spacing means cooperating to form an annular pocket on the lower face of said plate; said filtering medium being fixed adjacent the lower face of said plate within said pocket; said scraper having its upper edge formed to enter said pocket and to substantially conform to said filtering medium when moved upwardly and its lower edge formed to substantially conform to the upper surface of the next lower plate.

3. In a filter press substantially as defined in claim 1: an upper impervious surface on each said plate, said surface being sloped downwardly toward said central opening and a downward looking annular flange immediately surrounding said central opening, said flange and said spacing means cooperating to form an annular pocket on the lower face of said pocket; said filtering medium being fixed adjacent the lower face of said but any preferred type of manhole cover held by a screw thread, bayonet catches or temper bar and screw, may be used, or a straightway valve may be used, as shown in Fig. 5. A valve is preferable if a closed connection is to be made into a receptacle for conveying and treating cake. The nozzle is also provided with a pipe tapped opening 51, located as close to the lower end as is possible, this opening being used for filling, feeding, emptying and draining the press.

For operation the press is connected up in the following manner: Each of the filtrate inlets 37 is provided with a valve or cock 52 by means of which the plate may be rendered inoperative in case of leakage or damage to the filter cloth. These cocks are all connected with a pipe manifold 53 having a valve 54 at its upper and two valves 55 and 63 at its lower end. The upper valve 54 is connected to a source of supply, not shown, of steam, air or gas under pressure, the lower valve 55 to a tank, not shown, for receiving filtrate, and the lower valve 63 to a tank for receiving cloudy filtrate which requires to be refiltered. Each branch from this manifold may also be provided with a sample cock 56 from which a sample of the filtrate coming from that particular plate may be drawn.

Each of the steam inlets 46 is provided with a branch pipe 57 and each branch pipe with a regulating valve 58. These branch pipes are all connected into a steam manifold 60 which is provided at its upper end with a master steam valve 61 and at the lower end with a water drain valve 62.

The opening 51 in the bottom nozzle is provided with a pipe 64 having two branches 65 and 66, each provided with a valve. Valve 65 is connected to a feed pump or to a pressure vessel, not shown, from which a supply of liquid to be filtered may be drawn, and valve 66 is connected to a suitable vessel, not shown, into which the liquid contents of the shell may be discharged at the end of the filtration cycle.

The above described press is operated in the following manner, it being assumed in this description that the material to be filtered is a petroleum oil, such as lubricating oil, at a relatively high temperature, for instance 500° F., containing suspended spent decolorizing clay in fine powder and intermixed with steam and/or oil vapors, i. e., in the condition in which it would be discharged from the conventional hot clay-treatment coil.

The shaft 19 is set in motion and lowered to the position shown in Fig. 1, the scrapers then being in position 28A with the bottom of the scraper just clear of the plate beneath. Valves 54, 55, 58, 61, 62, 65 and 66 are closed, cocks 52 and cloudy filtrate valve 63 are open and the bottom plate 49 is locked in closed position.

Valve 65 is opened, admitting mixture to be filtered into the press, the air (or steam) contained in the press being displaced through cocks 52 and valve 63. The press being filled, liquid passes upwardly through the filtering media 40—41—42, passes out through cocks 52 and thence through pipe 53 and valve 63 to the cloudy filtrate tank. When the filtrate runs clear it is diverted to the receiving tank by opening valve 55 and closing valve 63.

The solids removed by the filtering media collect as a cake on the lower side of plates 10 and 11, this cake occupying the space surrounding the central nozzle 34 as indicated at 67 in the bottom chamber, Fig. 1. The mixture being introduced into the press under conditions of turbulence and being maintained in agitation by the revolution of the scrapers, the solids are kept in complete dispersion throughout the mixture and cakes of even thickness are formed throughout the press.

A particular and important function of my improved press is to effect filtration of oils from solids while passing a flow of steam through the cake thus formed, this procedure having material advantages but being no part of my present invention. Because of the extreme lightness of steam bubbles entrained in oil it is ordinarily difficult to distribute the steam over the surface of the cake and thus to act on all its parts equally, but in the present construction, because of the downward face exposed by the forming cake and the intermixing effect of the scrapers, distribution is even and complete.

Where oil is treated at high temperature with clays containing water a material quantity of steam is generated in the heating means and discharged with the oil, and it may be desirable in some cases to take the heater discharge directly into the press. But if this is impossible or undesirable, any required quantity of steam may be introduced into each chamber by opening the steam valve 61, draining any condensed water by temporarily opening drain valve 62, and introducing steam into each separate chamber by manipulation of the branch steam valves 58. This steam will immediately rise to the surface of the cake and spread thereover. The steam thus introduced flows through the cake with the filtrate to any known or preferred form of separating device, not shown.

When a sufficient thickness of cake has accumulated the press is drained by closing feed valve 65 and opening drain valve 66, the contents being discharged into a sump from which they may be picked up for later filtration. Or if preferred the oil contained in the press may be blown back to the reservoir from which the press is fed while filtering. During this stage in the operation the flow of steam into each chamber should be continued, to prevent the cakes from dropping, plate within said pocket; said scraper having its upper edge formed to enter said pocket and to substantially conform to said filtering medium when moved upwardly and its lower edge formed to substantially conform to the upper surface of the next lower plate.

4. In a filter press substantially as defined in claim 1: a downward looking annular flange immediately surrounding said central opening in each said plate, said flange and said spacing means cooperating to form an annular pocket on the lower face of said plate; said filtering medium being fixed adjacent the lower face of said plate within said pocket; said scraper having its upper edge formed to enter said pocket and to substantially conform to said filtering medium when moved upwardly and its lower edge formed to substantially conform to the upper surface of the next lower plate, and means for separately admitting a controlled supply of steam into each said pocket.

5. In a filter press substantially as defined in claim 1; means for limiting the upward vertical movement of said shaft to prevent said scraper from contacting with said medium.

6. A filter press comprising: a vertical hollow shell; means for introducing a liquid suspension into said shell; a plurality of horizontally disposed and vertically spaced metallic plates projected inwardly from the vertical wall of said shell, said plates being blank on the upper face and superficially channelled on the lower face; channels within said plates affording communication between said superficial channels and the exterior of said shell; a filtering fabric affixed to each said plate over said superficial channels; substantially central openings through said plates vertically aligned to form a substantially unobstructed passage for the downward movement of fragmental solid filter cake; a vent in the bottom of said shell for the escape of said fragmental cake and a removable closure therefor; and means for producing an unobstructed movement of said fragmental cake from the interspaces between said plates into said central passage and for agitating said suspension during the filtering operation, last said means comprising: a rotatable shaft vertically arranged in said central opening; scrapers affixed to said shaft, said scrapers projecting into said interspaces and having upper and lower edges adapted to conform to the adjacent surfaces of said plates; means for rotating said scrapers and means for imparting limited vertical movement to said scrapers while said shaft is in rotation.

7. A filter press comprising: a vertical hollow shell; means for introducing a liquid suspension into said shell; a plurality of horizontally disposed and vertically spaced metallic plates projected inwardly from the vertical wall of said shell, said plates being blank on the upper face and superficially channelled on the lower face; channels within said plates affording communication between said superficial channels and the exterior of said shell; a filtering fabric affixed to each said plate over said superficial channels; substantially central openings through said plates vertically aligned to form a substantially unobstructed passage for the downward movement of fragmental solid filter cake; a vent in the bottom of said shell for the escape of said fragmental cake and a removable closure therefor; and means for producing an unobstructed movement of said fragmental cake from the interspaces between said plates into said central passage and for agitating said suspension during the filtering operation, last said means comprising: a rotatable shaft vertically arranged in said central opening; scrapers affixed to said shaft, said scrapers projecting into said interspaces and having upper and lower edges adapted to conform to the adjacent surfaces of said plates; means for rotating said scrapers; means for imparting limited vertical movement to said scrapers while said shaft is in rotation and means for limiting upward movement of said scrapers to prevent abrasive contact of said scrapers with said filtering fabric.

In witness that I claim the foregoing I have hereunto subscribed my name this 25th day of February, 1930.

PAUL W. PRUTZMAN.